UNITED STATES PATENT OFFICE.

EVALD ANDERSON, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

LEACHING PROCESS FOR CEMENT-KILN DUST.

1,298,154.  Specification of Letters Patent.  Patented Mar. 25, 1919.

No Drawing.  Application filed June 4, 1917.  Serial No. 172,617.

*To all whom it may concern:*

Be it known that I, EVALD ANDERSON, a subject of the King of Sweden, and a resident of Los Angeles, in the county of Los Angeles and State of California, have invented a new and useful Leaching Process for Cement-Kiln Dust, of which the following is a specification.

This invention relates to extracting potassium compound from the dust collected, in electrical treaters or otherwise, from the effluent gases of cement kilns. In the present process of cement manufacture, one or more of the constituents of the cement raw mix contains, in some cases, an appreciable amount of potassium compound and under suitable conditions, the potassium constituent is largely volatilized and may be collected in electrical precipitating apparatus, or otherwise. It is found, however, that under certain conditions, particularly when coal is used as fuel in the kilns in such a way that the potassium-bearing vapor comes in contact with finely divided silicious ash particles resulting from combustion of the coal, a slowly soluble potassium compound is formed and consequently, when attempting to leach the collected volatilized potassium material with water under ordinary conditions—for example, with water at temperatures such as can be maintained at ordinary atmospheric pressure, only partial extraction is obtained in reasonable time.

I have found that if such cement kiln dust containing the difficultly or slowly soluble potassium compound is subjected to the action of water, under higher pressure than atmospheric pressure and at higher temperatures than 100° C., the extraction is much improved and the time for effective leaching is much shortened. The process hereinafter described is based on this discovery, said process consisting essentially in leaching the dust containing potassium compound with hot water under a pressure in excess of atmospheric pressure and at a temperature corresponding with that of saturated steam at such pressure.

My process is preferably carried out as follows: The treater dust, or material to be leached, is placed in, or run into a suitable digester, water being introduced into the digester along with such material or after introduction of such material and said water being brought to and maintained at a temperature and pressure sufficient to provide for the extraction of the desired amount of potassium compound in the required time. The water may be brought to this high temperature and pressure before introduction into the digester, or it may be introduced at a lower temperature and pressure and brought to the required temperature and pressure by the introduction of steam into water, this being the preferred operation, or if desired, the digester, or the contents thereof, may be heated by any suitable heating means, for example, steam coils.

As an example of my process, cement kiln dust taken from an electrical dust precipitator for a coal feed cement plant, and containing a total of potassium compound corresponding to 10.9% $K_2O$, was subjected to the action of steam and water, according to my process, under 200 pounds pressure, and at a temperature corresponding to saturated steam at that pressure, with the result that over 90% of its potassium content was made soluble in one hour—whereas, only 55% of such potassium content was made soluble in one hour's treatment with water at 100° C. The part remaining undissolved under these conditions, is mainly unaltered potassium compound of the raw mix, which is carried over in the form of dust and is substantially unaffected either by the heat or by the leaching operation.

I prefer to so carry out the process that the temperature and pressure are sufficiently high to recover at least 90% of the potassium compound within an hour or so. Such high recovery is not possible with water at temperatures 100° C., or below, in any practicable time.

When the material has been subjected to hot water in the manner stated, for a sufficient time, the solution may be drawn off and the potassium salt recovered therefrom by evaporation and cystallization, or by evaporating the solution to dryness.

The above described operation is aided by the lime which is generally present in cement kiln dust. In general, there is sufficient lime present in the cement kiln dust for effectively carrying out the above described process, but if the dust is deficient in lime, a sufficient amount of lime, or of cement kiln dust high in lime, may be added to the dust being treated, to provide for effective solution of the potassium compound.

The process above described may be applied generally to the recovery of potassium salt from flue dust coming from kilns or furnaces of any kind and containing potassium compound in appreciable amount and under conditions substantially similar to those which exist in cement kiln dust. For example, the process may be applied to advantage to the recovery of potassium compound from blast furnace flue dust, or from any flue dust containing lime in considerable proportion together with potassium compound in difficultly soluble form. In all such cases the cement kiln or other flue dust contains acid radicals ($SO_3$ and $CO_2$) resulting from combustion of constituents (carbon and sulfur) of the coal or fuel. I have found that the potassium compound produced in the case of cement kiln dust treated as above described is a potassium salt and is substantially free from potassium hydroxid, and this may be due to the presence of such acid radicals.

What I claim is:

1. The process of extracting potassium compound from cement kiln dust containing such compound in difficultly soluble form, which consists in digesting such dust with the water and admitting steam at a pressure above atmospheric pressure to said water while in presence of said material to raise the temperature of the water above 100° C., and thereby convert the difficultly soluble potassium compound to a readily soluble potassium salt.

2. The process of leaching slowly soluble potassium compound content in dust from cement kilns, said dust containing potassium compound in difficultly soluble form, due to use of coal as fuel, which consists in subjecting such dust to the action of hot water at a pressure in excess of atmospheric pressure and a temperature corresponding to that of saturated steam at such pressure, so as to convert the difficultly soluble potassium compound to a readily soluble potassium salt.

3. The process of leaching flue dust containing potassium compound in slowly soluble form, together with lime and with acid radicals resulting from combustion of coal, which consists in subjecting such dust to the action of hot water at a pressure above atmospheric pressure at a temperature corresponding to that of saturated steam at such pressure.

4. The process of leaching flue dust containing potassium compound in slowly soluble form and acid radicals resulting from combustion of coal, together with added lime, which consists in subjecting such dust to the action of hot water at a temperature above 100° C. and at a pressure above atmospheric pressure.

In testimony whereof I have hereunto set my hand, at Los Angeles, this 25th day of

EVALD ANDERSON.